3,012,892
METHOD FOR PRODUCING ALGINIC ACID
Friedrich-Karl Marcus, Geesthachter Strasse 103/105, Geesthacht-Elbe, Germany
No Drawing. Filed Oct. 5, 1959, Ser. No. 844,169
Claims priority, application Germany Nov. 3, 1958
6 Claims. (Cl. 99—131)

The present invention relates to a method for producing alginic acid of high purity and further to particularly pure alginates made therefrom.

It is known to treat brown algae (Phaeophyceae), and in particular *Laminaria digitata*, with a sodium carbonate solution or other alkaline substances. The alginic acid thus dissolved is again precipitated with hydrochloric acid. From the thus produced raw alginic acid, the water-insoluble alginic acid is recovered by the removal of cellulose from the raw product, bleaching, purification and drying. The water-insoluble alginic acid is converted for most practical purposes into a water-soluble alginate. It is the object of the present invention to provide alginic acid and the alginates made therefrom with a considerably higher degree of purity than former products, resulting in an essential improvement of the properties of the alginic acid and the alginates and further increasing the scope of application for alginic acids and alginates.

According to the invention the alginic acid is precipitated from a raw alginate solution by means of a hydrochloric acid calcium chloride solution. During the precipitation of the alginic acid there is added to the precipitation bath hydrochloric acid, in order to maintain the reaction medium at least at an acidity corresponding to the Congo red point, that is, at a pH not more than about 4.

The present invention is further improved by repeatedly dissolving the alginic acid in alkaline media followed by precipitation with an acid, the alginate and alginic acid being washed and, if desired, dehydrated after each step. According to a preferred embodiment of the present invention the brown algae are first immersed in a sodium carbonate solution, and the thus produced alginate solution treated with a hydrochloric acid calcium chloride solution. This step is followed by treating the thus precipitated alginic acid with a calcium hydroxide solution in order to convert the acid into calcium alginate, the latter again being treated with hydrochloric acid in order to recover pure alginic acid.

Before immersion into an alkaline solution it is further advantageous to treat the air-dry brown algae with a hydrochloric acid solution in a one step or several step method in order to liberate the alginic acid.

The thus produced alginic acid is snow white and is characterized by a maximum purity.

According to the present invention this washed and dehydrated alginic acid is placed into a masticator and there is gradually added an alkaline solution under continuous mastication. This composition is then added under agitation to alcohol, the alcohol being decanted after removal from the alcohol bath and the composition then washed with pure alcohol. The sodium alginate is then pressed out and the cake is ground as finely as possible, and dried.

A thus produced alginate can find particularly advantageous application for the stabilization of margarine.

Further improvements, suitable embodiments and results obtainable according to the present invention are discussed with reference to the detailed description.

The air-dry brown algae (*Laminaria digitata*) are coarsely chopped and washed three times with a weakly hydrochloric acid solution (pH 4) in order to remove calcium and magnesium salts from the algae structure, so that the alginic acid can be completely liberated. After the washings there is once more added to the mixture hydrochloric acid in an amount sufficient to bring the reaction medium to a pH not more than about 4 and the mixture left to itself for one to two hours. The mixture is now washed with pure water until the test for hydrochloric acid is negative.

The thus treated drug (100 kg.) is added to 5 cubic meters of a 0.5% sodium carbonate solution (calcinated sodium carbonate) and agitated slowly for several hours. This reaction converting the alginic acid into the sodium alginate can be accelerated by slightly heating. Care must, however, be taken not to increase the temperature over 50° C., because a higher heat results in a decomposition of the alginic acid. Such a decomposition later on impairs the viscosity of the final product. When treatment of this solution has been completed by prolonged agitation (3–4 hours) and this can be recognized by the disintegration of the parts of the algae and the slipperiness of the solution, said solution is separated from the residues of the algae. This separation can be effected in the usual manner by filtration, sedimentation, sucking or centrifuging. There is obtained a water clear solution. The degree of purity of this solution is of decisive importance for the quality of the final product. This solution, containing dyes of the algae, e.g. carotinoids, is subjected to a careful bleaching with the usual agents, like e.g. sodium hypochlorite, hydrogen peroxide etc.

After the solution has become completely water clear the alginic acid is precipitated from this solution as follows:

The now clear alginate solution is added under agitation to a 3.5° Bé. calcium chloride solution, which must be of a pH not more than about 4, in order to precipitate the alginic acid. During precipitation of the alginic acid the precipitation bath must be constantly checked whether it still is of a pH not more than about 4, because the hydrochloric acid is consumed by the sodium alginate solution. In consequence hydrochloric acid must be added continuously. The ratio of the amounts of calcium chloride solution to alginate solution is 1:5 (example: 500 l. alginate solution are poured under agitation into 100 l. of calcium chloride solution of a specific gravity of 3.5° Bé. having been acidulated, by hydrochloric acid, in an amount to bring the pH to no more than about 4).

The snow white alginic acid floats in the solution and accumulates on the surface. The hydrochloric acid solution is now drawn off and the remaining alginic acid is washed until neutral. To this neutral washed alginic acid there is now added a small amount of water. Under agitation there is added clarified calcium hydroxide solution until a pH of 9 is obtained, which value must not be altered later on. By this addition a part of the alginic acid is dissolved, the greater part, however, remains as undissolved calcium alginate in a considerably swollen state.

This solution is again brought down to no more than about pH 4 by the addition of hydrochloric acid, the alginic acid being recovered in pure form. This alginic acid is now thoroughly washed until a test for hydrochloric acid is negative. The snow white alginic acid floating on the surface is then removed and as far as possible dehydrated by either centrifuging or by any other suitable method as applied in chemical technology (e.g. suction).

For the liberation and precipitation of the alginic acid there can also be used instead of the hydrochloric acid other mineral acids.

Production of pure sodium alginate

The moist alginic acid obtained according to the above disclosure is placed into a suitable masticator for the reaction with sodium hydroxide in order to convert the acid into sodium alginate. During mastication the corresponding amount of sodium hydroxide of 42° Bé. is added dropwise until a pH of 8–9 is obtained. The white, spongy alginic acid loses its original consistency and becomes glassy and ropy. In order to expel the water and remove the surplus sodium hydroxide, this composition is now added to alcohol. It is important that the addition is effected under conditions of good agitation, so that the sodium alginate will not agglomerate and occlude sodium hydroxide, but is precipitated in the form of finely divided grains. A sufficient excess of alcohol must be used, so that after adding the sodium alginate from the masticator, the water content of the alcohol does not increase over 25%. The thus treated sodium alginate is removed from the alcohol bath and centrifuged in a centrifuge in order to first draw off the alcohol. The sodium alginate is then washed in the centrifuge with pure alcohol.

The alcohol used can be recovered by distillation. The sodium alginate is pressed out in order to further draw off the alcohol, and the cake is ground as finely as possible and then dried.

In the same manner all other salts of alginic acid, e.g. ammonium alginate, by the addition of ammonia containing water, magnesium alginate by the addition of magnesium hydroxide, calcium alginate by the addition of calcium hydroxide, lithium alginate by the addition of lithium hydroxide etc. can be produced.

The thus produced sodium alginate dissolves to a water clear solution. The compound is of high quality and purity. A 1% solution in water hardly flows. A 0.2% solution shows in a Höpler viscosimeter at 20° C. at least 50 cps. A quality up to 140 cps. can also be achieved by selection of the appropriate algae.

In respect to the application it has been found that this absolutely pure sodium alginate, when added in an amount of 0.03–0.1%, in most cases only 0.05%, calculated on the amount of water added to the margarine, improves the consistency of the margarine in a surprising manner. When such a margarine is kept in the refrigerator it remains elastic and can be spread with high gloss. The disadvantageous separation of oils from the margarine, particularly in the summer season, is considerably restricted. This results in a considerable improvement in respect to the discoloration at the edges of the margarine sales unit and at the surface thereof. The aroma of the margarine is better liberated and the fat and tallow taste of the margarine is removed.

The application of the alginate for this purpose can be effected according to the latest regulations in respect to food products. Therefore the alginate has the effect of a stabilizer in the margarine.

What I claim is:

1. In a method of producing alginic acid by leaching algae in an acid solution and digesting the leached material in an alkali solution to produce an alginate solution, the improvement comprising precipitating alginic acid from the alginate solution by admixing the alginate solution with an acidic calcium chloride solution to produce a mixture of the two solutions that is acidic as mixed.

2. A method as claimed in claim 1, said mixture having a pH not more than about 4 as mixed.

3. A method as claimed in claim 2, and adding mineral acid to the reaction medium during precipitation to maintain the pH not more than about 4.

4. A method as claimed in claim 1, the mixture being rendered acidic with hydrochloric acid.

5. A method as claimed in claim 1, and redigesting the precipitated alginic acid with alkali and reprecipitating alginic acid with mineral acid.

6. A method as claimed in claim 1, and washing the precipitated alginic acid with alcohol.

References Cited in the file of this patent

UNITED STATES PATENTS

| | | |
|---|---|---|
| 2,036,922 | Clark et al. | Apr. 7, 1936 |
| 2,156,036 | Wilt | Apr. 25, 1939 |

FOREIGN PATENTS

| | | |
|---|---|---|
| 319,333 | Great Britain | Dec. 11, 1930 |